(12) United States Patent
Hamamoto et al.

(10) Patent No.: US 9,902,649 B2
(45) Date of Patent: Feb. 27, 2018

(54) METHOD FOR PRODUCING SURFACE-TREATED GLASS FIBER FILM AND FLEXIBLE FIBER SUBSTRATE

(71) Applicant: SHIN-ETSU CHEMICAL CO., LTD., Tokyo (JP)

(72) Inventors: Yoshihira Hamamoto, Takasaki (JP); Saiko Akahane, Annaka (JP); Toshio Shiobara, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 531 days.

(21) Appl. No.: 14/695,369

(22) Filed: Apr. 24, 2015

(65) Prior Publication Data
US 2015/0315073 A1 Nov. 5, 2015

(30) Foreign Application Priority Data

May 2, 2014 (JP) ................................. 2014-095148

(51) Int. Cl.
*C03C 25/10* (2006.01)
*C03C 25/40* (2006.01)

(52) U.S. Cl.
CPC .......... *C03C 25/1095* (2013.01); *C03C 25/40* (2013.01); *C03C 2217/78* (2013.01); *Y10T 442/2369* (2015.04)

(58) Field of Classification Search
CPC . C03C 25/1095; C03C 25/40; C03C 2217/78; Y10T 442/2369
See application file for complete search history.

(56) References Cited

U.S. PATENT DOCUMENTS

2003/0004365 A1 1/2003 Isoda et al.

FOREIGN PATENT DOCUMENTS

| JP | S48-33000 | B1 | 10/1973 |
| JP | S52-63495 | A | 5/1977 |
| JP | H04-83741 | A | 3/1992 |
| JP | H09-209233 | A | 8/1997 |
| JP | H10-121363 | A | 5/1998 |
| JP | 2009-084116 | A | 4/2009 |
| JP | 4497977 | B2 | 7/2010 |
| JP | 2011-246597 | A | 12/2011 |
| JP | 4911544 | B2 | 4/2012 |
| WO | 2002/26749 | A1 | 4/2002 |

OTHER PUBLICATIONS

Dow Corning, A Guide to Silane Solutions Fiberglass and Composites, 2009. (Year: 2009).*
Nov. 22, 2016 Office Action issued in Japanese Patent Application No. 2014-095148.

* cited by examiner

*Primary Examiner* — Cephia D Toomer
(74) *Attorney, Agent, or Firm* — Oliff PLC

(57) ABSTRACT

The present invention provides a method for producing a surface-treated glass fiber film comprising steps of: preparing a treatment solution consisting of a mixture of a hydrolysable silane compound and a partially hydrolyzed condensate thereof; coating a glass fiber film with the treatment solution so that the attached amount of the mixture is 2% by mass or more and 90% by mass or less, relative to 100% by mass of the surface-treated glass fiber film and drying the same; and heat-treating the glass fiber film coated. There can be provided a method for producing a surface-treated glass fiber film having high strength, a low average coefficient of linear expansion, a high storage rigidity at high temperature and excellent in heat resistance, flexibility, electric insulation, dimensional stability, and surface homogeneity, with less environmental impact.

20 Claims, No Drawings

METHOD FOR PRODUCING SURFACE-TREATED GLASS FIBER FILM AND FLEXIBLE FIBER SUBSTRATE

BACKGROUND OF THE INVENTION

Field of the Invention

The present invention relates to a method for producing a surface-treated glass fiber film and a flexible fiber substrate.

Description of the Related Art

With remarkable progress of digital technological, major electronic devices such as personal computers and mobile phones have been thinned, miniaturized and advanced. For example, high-density mounting, thinning and miniaturizing is required for a printed substrate as a representative component thereof. To meet this requirement, improvement in property of a glass fiber film, as an essential component of a printed substrate, is being strongly desired. Also, higher speed and frequency of computers, mobile phones, communications infrastructures and other devices have been developed. Accordingly, a demand for a glass fiber film used in a printed wiring substrate is to be a low-dielectric material for improving transmission loss. The material having low thermal expansion and high tensile rigidity is also strongly required. Due to further requirement for thinning and miniaturizing on a component, development of a thinner glass fiber film has earnestly been required.

As shown in recent semiconductor package for mobile devices in particular, a demand for a printed wiring substrate is increasing according to high-density mounting, thinning and miniaturizing, and higher performance of a semiconductor package. For example, in order to prevent a warp of a package that has been mounted, a substrate material having a lower linear expansion is required. To meet this requirement, conventional technologies introduce a laminate substrate obtained by impregnating a glass fiber with an organic resin composition having a high content of an inorganic filler. However, a high viscosity of a resin composition causes unfastening or twisting of a glass fiber, resulting in impaired uniformity of a substrate and a warp of a package from intrinsic stress.

Some prior arts, such as those disclosed in the following Patent Documents, describe a glass fiber film.

Patent Document 1 discloses a treatment solution for a glass fiber consisting of a mixture of alkoxy silane having no functional group or a hydrolyzed condensate thereof or both thereof, and alkoxy silane having a functional group or a hydrolyzed condensate thereof or both thereof, using alcohol as a solvent. The glass fiber using the treatment solution shows improvement in film-forming property, weather resistance and water resistance.

Patent Document 2 discloses a transparent film formed by impregnating a substrate of a glass fiber surface-treated with an acryloxy coupling agent with an epoxy resin as a transparent resin composition and curing the same. The transparent film is excellent in transparency and heat resistance, and low in retardation.

Patent Document 3 discloses a glass fiber film for a printed wiring substrate, using a sizing agent for a glass fiber containing a film-forming component and a silane coupling agent, wherein the film-forming component is a water-soluble urethane or a water-soluble epoxy resin or both thereof, and the attached ratio of the sizing agent is in the range of 0.05% to 0.4%. The glass fiber film treated with the sizing agent demonstrates improvement in migration resistance.

In addition, Patent Document 4 discloses a sizing agent for a glass fiber consisting of an acetylene glycol surfactant, a film forming agent, and a silane coupling agent. Illustrative example of the film forming agent includes a urethane resin, an acrylic resin, an epoxy resin, and a polyester resin. The glass fiber treated with the sizing agent shows improvement in wettability resistance and sizing property.

As described above, while properties such as heat resistance and weather resistance to a glass fiber improved, strength, flexibility, surface homogeneity, and dimensional stability of the film produced therefrom are insufficiently assured.

Patent Document 5 discloses a surface-treated glass fiber film, wherein the attached amount of a silane coupling agent was reduced to 0.8 to $2.0\times10^{-5}$ mol/m$^2$ in order to improve electric insulation. The surface-treated glass fiber film demonstrates improvement in electric insulation.

Patent Document 6 discloses production of a prepreg using silicone oligomer, and employs a partially hydrolyzed condensate of alkoxy silane. The silicone oligomer is used to treat the prepreg, and the prepreg obtained shows improvement in drilling property and electric insulation.

Nevertheless, since the surface-treated glass fiber film disclosed in Patent Document 5 has a small attached amount of a silane coupling agent, properties such as heat resistance and dimensional stability are insufficiently assured.

The prepreg disclosed in Patent Document 6 is prone to thermal expansion and thus dimensional stability is insufficient. In addition, since flexibility is also insufficient, it is hard to use the prepreg as a flexible substrate.

Consequently, the above prior arts fail to provide a method for producing a surface-treated glass fiber film having high strength and excellent in flexibility, surface homogeneity, and dimensional stability, obtained by surface-treating a glass fiber film with a silane coupling agent, with less environmental impact.

PRIOR ART DOCUMENTS

Patent Documents

Patent Document 1: Japanese Patent No. 4911544
Patent Document 2: Japanese Patent Laid-Open Publication No. 2011-246597
Patent Document 3: Japanese Patent Laid-Open Publication No. H9-209233
Patent Document 4: Japanese Patent Laid-Open Publication No. 2009-84116
Patent Document 5: Japanese Patent No. 4497977
Patent Document 6: Japanese Patent Laid-Open Publication No. H10-121363

SUMMARY OF THE INVENTION

The present invention was made in view of the above situation, and has an object to provide a method for producing a surface-treated glass fiber film having high strength, a low average coefficient of linear expansion and a high storage rigidity at high temperature and excellent in heat resistance, flexibility, electric insulation, dimensional stability, and surface homogeneity, with less environmental impact.

To solve the problems as mentioned above, the present invention provides a method for producing a surface-treated glass fiber film comprising steps of: preparing a treatment solution consisting of a mixture of a hydrolysable silane compound and a partially hydrolyzed condensate thereof;

coating a glass fiber film with the treatment solution so that the attached amount of the mixture is 2% by mass or more and 90% by mass or less, relative to 100% by mass of the surface-treated glass fiber film and drying the same; and heat-treating the glass fiber film coated.

The method for producing a surface-treated glass fiber film can produce a surface-treated glass fiber film having high strength, a low average coefficient of linear expansion, and a high storage rigidity at high temperature and excellent in heat resistance, flexibility, resistance to discoloration, electric insulation, dimensional stability, and surface homogeneity. More advantageously, the method for producing a surface-treated glass fiber film of the present invention requires no use of an alcoholic solvent or an aromatic solvent such as toluene, thereby producing the surface-treated glass fiber film with less environmental impact.

Preferably, in the step of coating and drying, the method for producing a surface-treated glass fiber film bonds together all or part of a bundle of glass fibers comprising the glass fiber film using the mixture.

The method for producing a surface-treated glass fiber film can produce a surface-treated glass fiber film that is excellent in uniformity due to no twisting or unfastening, and excellent in dimensional stability at high temperature due to no stress concentration at high temperature.

Preferably, the method for producing a surface-treated glass fiber film produces a surface-treated glass fiber film having a value of a conventional flexural rigidity of the surface-treated glass fiber film measured by a method disclosed in JIS R 3420 that is 3 to 100 times, relative to a value of a conventional flexural rigidity of an untreated glass fiber film.

The method for producing a surface-treated glass fiber film can produce a surface-treated glass fiber film that is more excellent in dimensional stability, electric insulation, heat resistance, weather resistance, and flexibility.

Preferably, the method for producing a surface-treated glass fiber film produces the surface-treated glass fiber film, wherein the coefficient of linear expansion in an X-Y direction of 20 ppm/° C. or less.

The method for producing a surface-treated glass fiber film can produce a surface-treated glass fiber film preferably used in a printed substrate which requires high-density mounting and thinning and miniaturizing.

Preferably, the method for producing a surface-treated glass fiber film produces the surface-treated glass fiber film, wherein the glass transition temperature measured by a method disclosed in JIS C 6481 is not in the range of 250° C. or less.

The method for producing a surface-treated glass fiber film can produce a surface-treated glass fiber film that is more excellent in heat resistance and electric insulation that can preferably be used in a printed substrate which requires more advanced high-density mounting and thinning and miniaturizing.

Preferably, the method for producing a surface-treated glass fiber film employs one or more types of compounds selected from a halogenated silane compound, an alkoxy silane compound, a hydroxyl silane compound, and a silazane compound as the hydrolysable silane compound.

The method for producing a surface-treated glass fiber film using these types of compounds has less environmental impact.

The present invention provides a flexible fiber substrate using a surface-treated glass fiber film produced in the above method for producing a surface-treated glass fiber film.

The flexible fiber substrate is excellent in uniformity of the substrate obtained due to no twisting or unfastening and excellent in dimensional stability at high temperature due to no stress concentration at high temperature.

The method for producing a surface-treated glass fiber film of the present invention can produce a surface-treated glass fiber film having high strength and a low average coefficient of linear expansion and a high storage rigidity at high temperature and excellent in electric insulation, heat resistance, dimensional stability, resistance to discoloration, weather resistance, and flexibility, and excellent in oxygen barrier property, water vapor barrier property, and surface homogeneity due to use of a treatment solution consisting of a mixture of a hydrolysable silane compound and a partially hydrolyzed condensate thereof. Further, the method for producing a surface-treated glass fiber film of the present invention can produce the surface-treated glass fiber film with less environmental impact due to no use of an alcoholic solvent or an aromatic solvent.

In addition, since all or part of a bundle of glass fibers are bonded together in the surface-treated glass fiber film produced in the method for producing a surface-treated glass fiber film of the present invention, it is possible to provide a substrate that is excellent in uniformity of the substrate obtained due to no twisting or unfastening when it is used as a material for a substrate, and is excellent in dimensional stability at high temperature due to no stress concentration at high temperature. Further, it is possible to produce a surface-treated glass fiber film that corrects some defects such as requiring another support for mounting a heavy component thereon due to a low mechanical strength and poor thermal property found in a conventional flexible substrate. Accordingly, an excellent flexible fiber substrate can be provided from the surface-treated glass fiber film produced in the method for producing of the present invention.

DETAILED DESCRIPTION OF THE PREFERRED EMBODIMENTS

As described above, due to use of a printed substrate which requires high-density mounting and thinning and miniaturizing, a method for producing a substrate material having low coefficient of linear expansion and excellent in surface homogeneity with less environmental impact has been required.

Inventors of the present invention have carried out extended research and found that when a step of preparing a treatment solution consisting of a mixture of a hydrolysable silane compound and a partially hydrolyzed condensate thereof and coating a glass fiber film with the treatment solution is included in the method for producing a surface-treated glass fiber film, the above mentioned problems can be solved, whereby the present invention was accomplished.

The present invention provides a method for producing a surface-treated glass fiber film comprising steps of: preparing a treatment solution consisting of a mixture of a hydrolysable silane compound and a partially hydrolyzed condensate thereof; coating a glass fiber film with the treatment solution so that the attached amount of the mixture is 2% by mass or more and 90% by mass or less, relative to 100% by mass of the surface-treated glass fiber film and drying the same; and heat-treating the glass fiber film coated.

In the method for producing a surface-treated glass fiber film of the present invention, illustrative example of the hydrolysable silane compound used for a treatment solution for treating a glass fiber film includes a halogenated silane compound, an alkoxy silane compound, a hydroxyl silane compound, and a silazane compound. Among them, an alkoxy silane compound and a hydroxyl silane compound are preferably used, and an alkoxy silane compound is particularly preferably used in view of handleability and storage stability. These hydrolysable silane compounds can be used as one or more types of mixtures.

Illustrative example of the alkoxy silane compound includes the one shown by the following formula,

$$R_n^1 Si(OR^2)_{4-n}$$

wherein $R^1$ represents a group selected from a hydrogen atom, an alkyl group having 1 to 10 carbons, an aryl group having 6 to 12 carbons, an amino group-containing monovalent hydrocarbon group, a (meth)acrylic group-containing monovalent hydrocarbon group, and an epoxy group-containing monovalent hydrocarbon group; $R^2$ represents an alkyl group having 1 to 6 carbons; and "n" represents an integer of 0 to 3.

Illustrative example of the alkoxy silane compound includes tetraalkoxy silane such as tetramethoxy silane and tetraethoxy silane; alkylalkoxy silane such as trimethylmethoxy silane, trimethylethoxy silane, dimethyldimethoxy silane, dimethyldiethoxy silane, methyltrimethoxy silane, methyltriethoxy silane, n-propyltriethoxy silane, hexyltrimethoxy silane, octyltriethoxy silane, decyltrimethoxy silane, and 1,6-bis(trimethoxysilyl)hexane; arylalkoxy silane such as methylphenyldimethoxy silane, methylphenyldiethoxy silane, diphenyldimethoxy silane, diphenyldiethoxy silane, phenyltrimethoxy silane, phenyltriethoxy silane, and p-styryltrimethoxy silane; hydroxyalkoxy silane such as hydroxytrimethoxy silane and hydroxytriethoxy silane; alkenylalkoxy silane such as vinyl trimethoxy silane, and vinyl triethoxy silane; epoxy group-containing alkoxy silane such as 3-glycidoxypropyltrimethoxy silane, 3-glycidoxypropylmethyldimethoxy silane, 3-glycidoxypropyltriethoxy silane, 3-glycidoxypropylmethyldiethoxy silane, and 2-(3,4-epoxycyclohexyl)ethyltrimethoxy silane; (meth)acrylic group-containing alkoxy silane such as 3-methacryloxypropyltrimethoxy silane, 3-methacryloxypropylmethyldimethoxy silane, 3-methacryloxypropyltriethoxy silane, 3-methacryloxypropylmethyldiethoxy silane, and 3-acryloxypropyltrimethoxy silane; amino group-containing alkoxy silane such as N-2-(aminoethyl)3-aminopropyltrimethoxy silane, N-2-(aminoethyl)3-aminopropylmethyldimethoxy silane, 3-aminopropyltrimethoxy silane, 3-aminopropyltriethoxy silane, N-phenyl-3-aminopropyltrimethoxy silane, 3-allylaminopropyltrimethoxy silane, N—(N-vinylbenzyl)-2-aminoethyl-3-aminopropyltrimethoxy silane and a hydrochloride thereof, N—(N-vinylbenzyl)-2-aminoethyl-3-aminopropylmethyldimethoxy silane and a hydrochloride thereof; isocyanatealkoxy silane such as 3-isocyanatepropyltriethoxy silane, and tris-(trimethoxysilylpropyl)isocyanurate; 3-ureidopropyltriethoxy silane, 3-chloropropyltrimethoxy silane, 3-mercaptopropyltrimethoxy silane, 3-mercaptopropylmethyldimethoxy silane, bis(trisethoxysilylpropyl)tetrasulfide, and these alkoxy silanes may be used with a single kind or two or more in admixture. The alkoxy silane compound is not restricted thereto.

A preferable alkoxy silane is selected from methyltrimethoxy silane, phenyltrimethoxy silane, and alkoxy silane having a functional group commonly known as a silane coupling agent. Illustrative example of the alkoxy silane includes a silane coupling agent such as 3-mercaptopropyltrimethoxy silane, 3-glycidoxypropyltrimethoxy silane, and 3-aminopropyltrimethoxy silane.

To obtain the surface-treated glass fiber film of the present invention, a treatment solution for treating a glass fiber film is preferably a uniform and transparent aqueous solution consisting of a mixture of a hydrolysable silane compound and a partially hydrolyzed condensate thereof.

Herein, "uniform aqueous solution" refers to a treatment solution that is not subjected to phase separation when it is left to stand still. Specifically, it refers to a treatment solution that after a container containing a treatment solution is shaken at room temperature (15 to 30° C.) for 1 hour shake and left to stand still at room temperature, it is not separated into a water layer and an organic layer within 30 minutes, preferably within 1 hour, and more preferably within 2 hour.

Herein, "transparent aqueous solution" refers to a solution with no turbidity and scarce scattered lights in a colorless and transparent container. Specifically, a transparent treatment solution refers to a treatment solution whose turbidity value is 200 (formazin) or less, preferably 100 (formazin) or less, and more preferably (formazin) or less according to a formazin standard solution described in JIS K 0101 "industrial water test method".

In order to obtain a uniform and transparent aqueous solution, it is required to use a mixture of a hydrolysable silane compound and a partially hydrolyzed condensate thereof. When only a hydrolysable silane compound is present in an initial reaction phase, the compound is not dissolved in water, leading to phase separation. When a hydrolysis reaction continues up to completion and only a hydrolysable silane compound condensate is present, the condensate is hardly dissolved in water to cause turbidity and phase separation in a treatment solution.

The mixing ratio (% by mass) of the above mixture in the treatment solution of the present invention to water varies according to the type of a hydrolysable silane compound used as a starting material. A mixture of a hydrolysable silane compound and a partially hydrolyzed condensate thereof: water is 2 to 80:20 to 98, and preferably 5 to 60:40 to 95 (% by mass).

Preferably, the treatment solution of the present invention contains no alcoholic solvent. An organic acid such as formic acid, acetic acid, propionic acid, and oxalic acid, and a pH controlling agent such as ammonia water may be added to the treatment solution.

In particular, since addition of acetic acid promotes hydrolysis of a hydrolysable silane compound, particularly of alkoxy silane, and contributes to stabilization of a silanol group, dissolution of each type of alkoxy silane is improved. Therefore, in a system where acetic acid is added to a treatment solution, even if the amount to be added of a mixture of a hydrolysable silane compound and a partially hydrolyzed condensate thereof is small in an aqueous solution, the attached amount to a glass fiber film is large and it is preferable in view of production efficiency. The amount of acetic acid to be added is 0.02% by mass to 1.0% by mass, and preferably 0.05% by mass to 0.5% by mass, relative to 100% by mass of a treatment solution. Addition of a pH controlling agent is preferable, because it increases the attached amount of alkoxy silane and a partially hydrolyzed condensate thereof.

A condensation catalyst may be added to the treatment solution of the present invention. Illustrative example thereof includes an organometallic compound such as an organotin compound, an organotitanium compound, and an organobismuth compound, and an amine compound.

The condensation catalyst of the organometallic compound may be exemplified by metallic Lewis acids. Illustrative example thereof includes an organotin compound such as dibutyltin dimethoxide, dibutyltin diacetate, dibutyltin dioctoate, dibutyltin dilaurate, dibutyltin bis(acetylacetonato), dibutyltin bis(benzyl maleate), dimethyltin dimethoxide, dimethyltin diacetate, dioctyltin dioctoate, dioctyltin dilaurate, tin dioctoate, and tin dilaurate; an organotitanium compound such as tetraisopropyltitanate, tetra-n-butyltitanate, tetratertiarybutyltitanate, tetra-n-propyltitanate, tetra-2-ethylhexyltitanate, diisopropylditertiarybutyltitanate, dimethoxy titanium bisacetylacetonato, diisopropoxy titanium bisethylacetoacetate, ditertiarybutoxy titanium bisethylacetoacetate, and ditertiarybutoxy titanium bismethylacetoacetate; an organobismuth compound such as bismuthtris (2-ethylhexanoate) and bismuthtris (neodecanoate), and these can be used solely or as a combination of two or more of them.

Illustrative example of the amine compound includes hexylamine, di-2-ethylhexylamine, N,N-dimethyldodecyl amine, di-n-hexylamine, dicyclohexylamine, di-n-octyl amine, and hexamethoxymethylmelamine.

Among these condensation catalysts, an organotitanium compound is particularly preferable.

By adding a colloidal silica to the above treatment solution as a filler, the film can be improved in conventional flexural rigidity, heat resistance, and slip preventive property can be provided. Illustrative example of the colloidal silica (silica sol) includes SILFIX (Product from Shin-Etsu Chemical Co., Ltd.: slip preventing agent), SNOWTEX (Product from Nissan Chemical Industries Ltd.: silica sol), LIGHTSTAR (Product from Nissan Chemical Industries Ltd.: silica sol), and ADELITE AT series (Product from ADEKA Corporation). The amount to be added is 0% by mass to 100% by mass, preferably 5% by mass to 80% by mass, and more preferably 10% by mass to 60% by mass, relative to 100% by mass of a treatment solution consisting of a mixture of a hydrolysable silane compound and a partially hydrolyzed condensate thereof and distilled water. If the colloidal silica is 100% by mass or less, dispersion of a micronized silica in a treatment solution is stable, and there are no technical problems with working properties, coating processability, and uniformity of product. Also, no separation of silica from the resulting film is found.

In order to obtain more favorable properties such as electric insulation, heat resistance, dimensional stability, and flexibility, the attached amount of the mixture to a treated glass fiber film is 2% by mass or more and 90% by mass or less, preferably 5% by mass or more and 70% by mass or less, and more preferably 10% by mass or more and 60% by mass or less, relative to 100% by mass of the surface-treated glass fiber film.

The attached amount of under 2% by mass leads to deterioration of properties such as electric insulation, heat resistance, dimensional stability, and self-standing property. The attached amount of over 90% by mass can cause lowering heat resistance, impairing flexibility, and deteriorating electric insulation and dimensional stability.

When a glass fiber film is coated with a sizing agent, the agent is preferably removed in advance, because treatment by a treatment solution is sometimes inhibited.

The method for producing a surface-treated glass fiber film using the above treatment solution can produce a surface-treated glass fiber film having high strength and low average coefficient of linear expansion, a high storage rigidity at high temperature and excellent in heat resistance, flexibility, electric insulation, dimensional stability and surface homogeneity, with less environmental impact.

The glass fiber film used in the present invention preferably comprises a filamentary glass fiber, and can be subjected to fabric-opening using a column-like flow or water flow by high-frequency oscillation method. Moreover, illustrative example of the glass fiber used in the present invention includes any glass fiber such as E glass, A glass, D glass, and S glass. A commonly used E glass is preferable in view of costs and availability, while quartz glass is preferable in the case that more advanced properties are required (e.g. low dielectric constant, high heat resistance, and low impurities).

In addition, with regard to the above glass fiber film, the fiber weaving density is preferably 10 to 200 yarns/25 mm, and more preferably 15 to 100 yarns/25 mm, and the mass is preferably 5 to 400 g/m$^2$, and more preferably 10 to 300 g/m$^2$. If these values are within these ranges, the surface-treated glass fiber film of the present invention with the above effects can be readily provided.

The weaving method is not particularly restricted, and plain weave, sateen weave, twill weave, mat weave and so on can be used. A glass fiber film may be woven with a textured glass fiber on both sides or either side thereof. Further, a 3-spindle braided glass fiber film is of higher strength, and can be a highly reliable surface-treated glass fiber film.

In addition, non-woven fabrics or woven fabrics in which long fibers arranged in a constant direction can be used.

In the present invention, according to a required property, woven fabrics obtained by mixing an inorganic fiber such as a carbon fiber, a ceramic fiber, a metal fiber such as a boron fiber, a steel fiber and a tungsten fiber, and novel heat-resistant fiber such as an aramid fiber, phenol fiber with the above glass fiber can be used as a glass fiber film.

As the method for coating a glass fiber film with the treatment solution used in the present invention, a common method for coating a glass fiber is applied. As a representative coating method, there are a direct gravure coater, a chamber doctor coater, an offset gravure coater, a roll kiss coater, a reverse kiss coater, a bar coater, a reverse roll coater, a slot die, an air doctor coater, a forward roll coater, a blade coater, a knife coater, a dip coater, a MB coater, and a MB reverse coater. Among them, a direct gravure coater, an offset coater, and a dip coater are preferable for producing the surface-treated glass fiber film of the present invention.

After a glass fiber surface is treated with a treatment solution according to the above coating method, the glass fiber is introduced into a multitier oven to be dried and cured. In order to improve drying efficiency and to improve efficiency in the oven, the surface thereof is preferably heated and dried with a far-infrared heater just after coating.

Although the condition is different depending on the treatment solution used, after the glass fiber is coated and dried it is heated to be cured at room temperature to 300° C. for 1 minute to 24 hours. In view of productivity, costs and working properties, the glass fiber is preferably heat-treated at 100° C. to 250° C. for 3 minutes to 4 hour, and more preferably at 150° C. to 230° C. for 5 minutes to 1 hour to produce the surface-treated glass fiber film of the present invention. In this process, heating in the step of drying and heating to remove sense of stickiness from the surface may simultaneously be carried out.

In order to obtain more favorable properties such as electric insulation, heat resistance, weather resistance, dimensional stability, and flexibility, the value of the conventional flexural rigidity of the surface-treated glass fiber film measured by a method disclosed in JIS R 3420 is preferably in the range of 3 to 100 times, relative to the value of the conventional flexural rigidity of an untreated glass fiber film.

The value of the conventional flexural rigidity is a value measured by a method disclosed in JIS R 3420. A multiple thereof refers to an index of showing the degree of changing from so-called "woven fabrics" to "film" by surface-treating a glass fiber film. In the surface-treated glass fiber film of the present invention, the multiple of the value of the conventional flexural rigidity is preferably 3 to 100 times, more preferably 5 to 60 times, and much more preferably 10 to 50 times, relative to the measured value of the untreated glass fiber film measured.

If the multiple is 3 or more, dimensional stability and glass fiber fixation as expected by the present invention, that is, the preventing effects of a twisting or an unfastening, can be obtained. Also, electric insulation and heat resistance derived from siloxane properties, and weather resistance derived from properties such as oxygen barrier property and water vapor barrier property can sufficiently be assured. If the multiple is 100 or less, the flexural rigidity does not become too hard, resulting in no crack to obtain flexibility as a flexible substrate.

The coefficient of linear expansion in an X-Y direction of the surface-treated glass fiber film of the present invention is preferably 20 ppm/° C. or less, and more preferably 15 ppm/° C. or less. Illustrative example of the method for measuring the coefficient of linear expansion in an X-Y direction includes a method for measuring the coefficient by cutting out a sample having 3 mm in width and 25 mm in length, and 50 to 300 mm in thickness and applying a load of 100 mN by a thermomechanical analysis (TMA) apparatus in the temperature range of −60° C. to 200° C. at a temperature raising rate of 5° C./rain by tensile test. If the coefficient of linear expansion is at 20 ppm/° C. or less, that is, it is a low coefficient of linear expansion, high-density mounting, thinning and miniaturizing requirements for a printed substrate can be met. In addition, such a film can be used as an electrically insulated, heat-resistant film for aerospace field and aircraft field used on harsh conditions.

The coefficient of linear expansion of a polyetherimide film as a commonly used high heat-resistant engineering plastic film is 50 ppm/° C. or so. On the other hand, if the surface-treated glass fiber film of the present invention has the above coefficient of linear expansion, the present invention can provide a film having a low coefficient of linear expansion as well as excellent in heat resistance.

The surface-treated glass fiber film according to the present invention preferably does not have a glass transition temperature measured by a method disclosed in JIS C 6481 in the range of 250° C. or less, particularly preferably not in the range of 300° C. or less. If the surface-treated glass fiber film does not have a glass transition temperature in the range of 250° C. or less, a substrate that is excellent in heat resistance with reduced thermal warp can be provided. Therefore, high-density mounting, thinning and miniaturizing requirements can be met for a printed substrate. Also, a glass fiber film that is excellent in heat resistance and electric insulation can be provided.

The method for producing a surface-treated glass fiber film of the present invention can produce a surface-treated glass fiber film having high strength, a low average coefficient of linear expansion, a high storage rigidity at high temperature and excellent in heat resistance, flexibility, electric insulation, and dimensional stability, and surface homogeneity, with less environmental impact.

The glass fiber film treated with the treatment solution obtained by the method for producing a surface-treated glass fiber film of the present invention can preferably be used as a material of a flexible fiber substrate.

The surface-treated glass fiber film thus produced is surface-treated with a hydrolysable silane compound and a partially hydrolyzed condensate thereof, and is excellent in heat resistance, electric insulation, dimensional stability, discoloration resistance, light resistance, and weather resistance. Also, since it has self-standing property which had not been possessed by an untreated glass fiber and the fiber is fixed, a uniform and homogeneous glass fiber film which causes no twisting or unfastening of the glass fiber during the time of filling with a resin can be obtained. The glass fiber film can be used even as a single sheet and as a laminate as well. In addition, it can be used as a resin plate by itself, and possibly as a substrate for reinforcing a prepreg. By conducting copper-clad or copper-plate on a surface, a metal-clad substrate can be prepared and it can be used as an LED-mounting substrate.

As described above, since the surface-treated glass fiber film of the present invention is provided with excellent modulus of rigidity, weather resistance, and high strength on a glass fiber, it can be introduced as materials for sports and leisure goods such as tennis racket, golf shaft, baseball bat, and fishing rod, as materials for reinforcing aircraft components and aerospace rockets, and as light, high rigid, high strength materials for transportation such as automobiles, bicycles, and ships. In addition, using properties such as light, high strength, flame retardance, the surface-treated glass fiber film can be used for a bulletproof vest. Also, the surface-treated glass fiber film produced by the method for producing a surface-treated glass fiber film of the present invention can be used in various fields like civil engineering for repair work of infrastructures e.g. as a reinforcing material of a bridge pier, using properties such as high strength, high durability and weather resistance.

EXAMPLES

The present invention will be described with reference to the Examples and Comparative Examples, and the present invention is not restricted to the following Examples.

Example 1

50% by mass of 3-aminopropyltrimethoxy silane and 50% by mass of distilled water were mixed using 3-aminopropyltrimethoxy silane (Name: KBM-903, Product of Shin-Etsu Chemical Co., Ltd.) as a hydrolysable silane compound and agitated with a shaker at 25° C. for 1 hour. Using a colorless and transparent treatment solution prepared, the solution was impregnated in a glass fiber film (used yarn: E250, density: 59 warps/25 mm, 57 wefts/25 mm, thickness: 87 μm, mass: 95 g/m$^2$), and water was dried at 120° C. for 10 minutes. Thereafter, the product was heat-treated at 100° C. for 1 hour and at 200° C. for 1 hour to produce a glass fiber film. The attached amount of a mixture of a hydrolysable silane compound and a partially hydrolyzed condensate thereof is shown in Table 1. The following measurement was conducted using a surface-treated glass fiber film obtained.

Mechanical Property

The mechanical property was measured using a surface-treated glass fiber film obtained.

1. Conventional Flexural Rigidity

The measurement was conducted by a method described in JIS R 3420 (ordinary test method for glass fiber), and the measured value in the warp direction was used. The results are shown in Table 1.

2. Coefficient of Linear Expansion

By cutting out a sample having 3 mm in width, 25 mm in length, 50 to 300 mm in thickness from a surface-treated glass fiber film obtained and applying a load of 100 mN by a thermomechanical analysis (TMA) apparatus (Name of apparatus: TMA/SS6000, Product from Seiko Instruments Inc.), a tensile test was conducted at −60° C. to 200° C. at a temperature raising rate of 5° C./rain. The thermal expansion coefficient was measured from the amount of elongation of the surface-treated glass fiber film according to temperature change.

3. Glass Transition Temperature

A sample having 4 to 6 mm in width, 30 to 40 mm in length, and 50 to 300 mm in thickness was cut out from a surface-treated glass fiber film obtained, and whose glass transition temperature in a direction parallel to the surface-treated glass fiber film (in an X-Y axial direction) was measured at −100° C. to 300° C. by a dynamic viscoelasticity analysis apparatus (Name of apparatus: Q800, Product from TA Instruments) by a method described in JIS C 6481. When a glass transition temperature is found in the measurement range, the value is shown in Table 1, and when a glass transition temperature is not found in the temperature range, the temperature data is shown as "not detected" in Table 1.

Example 2

5% by mass of 3-glycidoxypropyltrimethoxy silane was added to 95% by mass of distilled water using 3-glycidoxypropyltrimethoxy silane (Name: KBM-403, Product from Shin-Etsu Chemical Co., Ltd.) as a hydrolysable silane compound, and 0.5% by mass of acetic acid was added thereto and shaken at 25° C. for 1 hour to prepare a colorless and transparent treatment solution. Other conditions were the same as Example 1 to produce a glass fiber film. The evaluation was conducted as in Example 1, and the results are shown in Table 1.

Example 3

Using 3-aminopropyltrimethoxy silane (Name: KBM-903, Product from Shin-Etsu Chemical Co., Ltd.) in place of 3-glycidoxypropyltrimethoxy silane (Name: KBM-403, Product from Shin-Etsu Chemical Co., Ltd.) of Example 2, a glass fiber film was produced. Other conditions were the same as in Example 2, and the treatment solution was colorless and transparent. The evaluation was conducted as in Example 1, and the results are shown in Table 1.

Example 4

20% by mass of SNOWTEX ST-O (Product from Nissan Chemical Industries Ltd.) as a colloidal silica was added to 100% by mass of a treatment solution produced in Example 3 to prepare a treatment solution. The treatment solution was colorless and transparent. A glass fiber film (Product from Nitto Boseki Co., Ltd., Heat Cloth 87 μm in thickness) was impregnated therewith on the same conditions as in Example 1, and heat-cure treated. The results are shown in Table 1.

Example 5

A glass fiber film (Product from Nitto Boseki Co., Ltd., Heat Cloth 42 μm in thickness) having different thickness was impregnated with a treatment solution prepared in Example 1 on the same conditions as in Example 1, and heat-cure treated. The results are shown in Table 1.

Example 6

A glass fiber film (Product from Nitto Boseki Co., Ltd., Heat Cloth 42 μm in thickness) having different thickness was impregnated with a treatment solution prepared in Example 2 on the same conditions as in Example 1, and heat-cure treated. The results are shown in Table 1.

Comparative Example 1

5% by mass of 3-glycidoxypropyltrimethoxy silane (Name: KBM-403, Product from Shin-Etsu Chemical Co., Ltd.) was added to 95% by mass of toluene at 25° C. for 1 hour and shaken with a shaker to prepare a treatment solution. Using the colorless and transparent treatment solution, a glass fiber film was produced on the same conditions as in Example 1. The evaluation was conducted as in Example 1, and the results are shown in Table 1.

Comparative Example 2

0.5 parts by mass of 3-glycidoxypropyltrimethoxy silane (Name: KBM-403, Product from Shin-Etsu Chemical Co., Ltd.), 0.02 parts by mass of polyoxyethylene octylphenylether whose HLB is 13.6 as a surfactant, and 0.05 parts by mass of acetic acid were added to 100 parts by mass of water, and shaken with a shaker at 25° C. for 1 hour to prepare a colorless and transparent treatment solution. Using the treatment solution, a glass fiber film was produced on the same conditions as in Example 1. The evaluation was conducted as in Example 1, and the results are shown in Table 1.

Comparative Example 3

Using 0.5% by mass of 3-aminopropyltrimethoxy silane (Name: KBM-903, Product from Shin-Etsu Chemical Co., Ltd.) in place of 3-glycidoxypropyltrimethoxy silane, a glass fiber film was produced. Other conditions were the same as in Comparative Example 2. Using the glass fiber film produced, the evaluation was conducted as in Example 1. The results are shown in Table 1.

Comparative Example 4

3-Glycidoxypropyltrimethoxy silane (Name: KBM-403, Product from Shin-Etsu Chemical Co., Ltd.) was charged into a mold (200 mm×240 mm×3 mm) treated with Teflon (Registered Trademark) and a glass fiber film (used yarn: E250, density: 59 warps/25 mm, 57 wefts/25 mm, thickness: 87 μm, mass: 95 g/m$^2$) was immersed therein to be heated and dried at 100° C. for 10 minutes. The attached amount of the mixture was 92% by mass. Due to a big crack generated on the surface-treated glass fiber film, no further measurement was allowed.

TABLE 1

| Hydrolysable silane compound | Effective amount (% by mass) | Glass fiber film thickness (μm) | Conventional flexural rigidity ratio*1 | Attached amount (% by mass) | Linear expansion coefficient (ppm/° C.) | Glass transition temperature (° C.) |
| --- | --- | --- | --- | --- | --- | --- |
| Example ||||||||
| 1. KEM-903 | 50 | 87 | 12.3 | 3.2 | 7 | Not detected |
| 2. KBM-403 | 5 | 87 | 8.9 | 5.7 | 8 | Not detected |
| 3. KBM-903 | 5 | 87 | 19.8 | 10.5 | 9 | Not detected |
| 4. KBM-903 + SNOWTEX ST-O | 5 | 87 | 21.9 | 16.2 | 9 | Not detected |
| 5. KBM-903 | 50 | 42 | 16.7 | 40.8 | 11 | Not detected |
| 6. KBM-403 | 5 | 42 | 24.4 | 50.3 | 12 | Not detected |
| Comparative Example ||||||||
| 1. KBM-403 | 5 | 87 | 1.3 | 0.2 | 6 | Not detected |
| 2. KBM-403 | 0.5 | 87 | 1.7 | 0.05 | 6 | Not detected |
| 3. KBM-903 | 0.5 | 87 | 1.5 | 0.1 | 6 | Not detected |
| 4. KBM-403 | 100 | 87 | Measurement not possible | 92.0 | Measurement not possible | Measurement not possible |

*1Conventional flexural rigidity ratio (times) = Conventional flexural rigidity of surface-treated glass fiber film/Conventional flexural rigidity of untreated glass fiber film As shown in Table 1, in the surface-treated glass fiber films of Examples 1 to 6, the attached amount of the mixture each was 2% by mass or more and 90% by mass or less, relative to 100% by mass of the surface-treated glass fiber film treated with the treatment solution. In addition, since an alcoholic solvent or an aromatic solvent is not necessarily used to prepare a treatment solution, the process is environmentally friendly. Meanwhile, in the surface-treated glass fiber films of Comparative Examples 1 to 4, the attached amount of the mixture each was not 2% by mass or more and 90% by mass or less.

4. Shape Change Test

Using the surface-treated glass fiber films produced in Examples 1 to 6, and Comparative Examples 1 to 4, and the surface-treated glass fiber film produced with an untreated glass fiber film (used yarn: E250, density: 59 warps/25 mm, 57 wefts/25 mm, thickness: 87 μm, mass: 95 g/m²) of Comparative Example 5, the following comparative evaluation test was conducted.

In advance, a slurry of a high filler-containing epoxy resin composition consisting of 10 parts by mass of a cresol novolak epoxy resin (Name: EPICRON N-695, Product from DIC Corporation), 5 parts by mass of a phenol novolak resin (Name: PHENOLITE TD-2090, Product from DIC Corporation), 0.1 parts by mass of an imidazole catalyst (Name: 1B2PZ, Product from Shikoku Chemicals Corporation), 85 parts by mass of a spherical silica (Name: SC-2050-SE, Product from Admatechs Company Limited) and 50 parts by mass of a MEK solvent was prepared.

After each of the surface-treated glass fiber films or the untreated glass fiber film was impregnated with the above slurry of high filler-containing epoxy resin composition, the product was dried at 100° C. for 10 minutes and placed in a mold, and pressed on condition of temperature: 200° C., Pressure: 2 MPa, pressing duration: 70 minutes to visually observe change in shape of a film such as unfastening and twisting. Also, after IR reflow treatment was conducted at 260° C. for 60 seconds using the surface-treated glass fiber films and the untreated glass fiber film (Comparative Example 5) by IR reflow apparatus (Name of apparatus: TNR15-225LH, Product from Tamura Corporation), the change in color of the surface thereof was visually observed.

The results are shown in Table 2.

TABLE 2

| | Example 1 | Example 2 | Example 3 | Example 4 | Example 5 | Example 6 | Comparative Example 1 | Comparative Example 2 | Comparative Example 3 | Comparative Example 4 | Comparative Example 5 |
| --- | --- | --- | --- | --- | --- | --- | --- | --- | --- | --- | --- |
| Change in shape*2 | Good | Good | Good | Good | Good | Good | Not good | Not good | Not good | Not good | Not good |
| Change in color | None | None | None | None | None | None | None | None | None | Found | None |

*2Change in shape
Good: Favorable, unfastening not found
Not good: unfastening found, twisted found As shown in Table 2, it was found that since the surface-treated glass fiber films of Examples 1 to 6 showed less change in shape when pressed, they are excellent in dimensional stability, and due to no change in color on the surface, they are also excellent in heat resistance and discoloration resistance. Meanwhile, it was found that the surface-treated glass fiber films of Comparative Examples 1 to 4, and the untreated glass fiber film of Comparative Example 5 are poor in dimensional stability, and the surface-treated glass fiber film of Comparative Example 4 is poor in heat resistance and discoloration resistance.

Example 7

Two sheets of the surface-treated glass fiber film obtained in Example 1 were laminated with an addition-type silicone resin adhesive (Name of product: KE-109, Product from Shin-Etsu Chemical Co., Ltd.), pressure-molded with a hot press machine on condition of a pressure of 2 MPa at 150° C. for 30 minutes, and secondary-cured at 150° C. for 1 hour to obtain a laminate sheet. The following evaluation was conducted for the laminate sheet obtained. The evaluation results are shown in Table 3.

5. Appearance

The surface of the laminate sheet obtained was visually observed to confirm whether the film has an unfastening or a twisting.

6. Heat Resistance and Discoloration Resistance

After IR reflow treatment was conducted at 260° C. for 60 seconds using the obtained laminate sheet by an IR reflow apparatus (Name of apparatus: TNR15-225LH, Product from Tamura Corporation), the change in color of the surface thereof was visually observed.

Example 8

Using the surface-treated glass fiber film obtained in Example 3, a laminate sheet was obtained by the same method as in Example 7. Using the laminate sheet obtained, the appearance, heat resistance and discoloration resistance were evaluated as in Example 7. The results are shown in Table 3.

Example 9

Using the surface-treated glass fiber film obtained in Example 6, a laminate sheet was obtained by the same method as in Example 7. Using the laminate sheet obtained, the appearance, heat resistance and discoloration resistance were evaluated as in Example 7. The results are shown in Table 3.

Example 10

The surface-treated glass fiber film obtained in Example 1 was impregnated with a slurry solution of an epoxy resin composition consisting of 10 parts by mass of a cresol novolak epoxy resin (Name of product: EPICRON N-695, Product from DIC Corporation), 5 parts by mass of a phenol novolak resin (Name of product: PHENOLITE TD-2090, Product from DIC Corporation), 0.1 parts by mass of an imidazole catalyst (Name of product: 2E4MZ, Product from Shikoku Chemicals Corporation), 85 parts by mass of a spherical silica (Name of product: SC-2050-SE, Product from Admatechs Company Limited) and 50 parts by mass of a MEK solvent, and dried at 100° C. for 10 minutes to obtain an uncured epoxy resin impregnated glass fiber film. Four sheets of the obtained uncured epoxy resin impregnated glass fiber film were pressure-molded with a hot press machine on condition of a pressure of 2 MPa at 150° C. for 30 minutes, and secondary-cured at 150° C. for 1 hour to obtain a laminate sheet. Using the laminate sheet obtained, the appearance, heat resistance and discoloration resistance were evaluated as in Example 7. The results are shown in Table 3.

Comparative Example 6

An untreated glass fiber film (used yarn: E250, density: 59 warps/25 mm, 57 wefts/25 mm, thickness: 87 μm, mass: 95 g/m$^2$) was used to obtain a laminate sheet. Other conditions were the same as in Example 10. Using the laminate sheet obtained, the appearance, heat resistance and discoloration resistance were evaluated as in Example 7. The results are shown in Table 3.

TABLE 3

|  | Example 7 | Example 8 | Example 9 | Example 10 | Comparative Example 6 |
|---|---|---|---|---|---|
| Change in shape*[3] | Good | Good | Good | Good | Not good |
| Change in color | None | None | None | Found | Found |

*[3]Change in shape
Good: Favorable, unfastening not found
Not good: unfastening and/or twisted found As shown in Table 3, since surface-treated glass fiber films produced by the method for producing a surface-treated glass fiber film of the present invention are used in producing the laminate sheets of Example 7 to 9, a substrate excellent in dimensional stability due to less change in shape when pressed and excellent in heat resistance and discoloration resistance due to no change in color of surface, can be provided. Since a laminate sheet is produced by using no epoxy resin, it is possible to obtain a laminate sheet in which discoloration of a substrate being problematic in a conventional glass epoxy substrate can be depressed. It is found that the laminate sheet of Example 10 shows a small change in shape when pressed, and is excellent in dimensional stability. However, because impregnation of an epoxy resin caused change in color of surface, it is poorer in heat resistance and discoloration resistance than other Examples.

Meanwhile, since a laminate sheet of Comparative Example 6 using a glass fiber film not surface-treated with the treatment solution of the present invention showed a change in shape when pressed and a change in color of surface, it is poor in dimensional stability, heat resistance and discoloration resistance. Thus, as described above, it is considered inappropriate for use as a substrate.

It must be stated here that the present invention is not restricted to the embodiments shown by Examples. The embodiments shown by Examples are merely examples so that any embodiments consisting of substantially the same technical concept as disclosed in the claims of the present invention and expressing a similar effect are included in the technical scope of the present invention.

What is claimed is:

1. A method for producing a surface-treated glass fiber film comprising steps of: preparing a treatment solution consisting of a mixture of a hydrolysable silane compound and a partially hydrolyzed condensate thereof; coating a glass fiber film with the treatment solution so that the attached amount of the mixture is 2% by mass or more and 90% by mass or less, relative to 100% by mass of the surface-treated glass fiber film and drying the same; and heat-treating the glass fiber film coated.

2. The method for producing a surface-treated glass fiber film according to claim 1, wherein, all or part of a bundle of glass fibers comprising the glass fiber film are bonded together by the mixture in the step of coating and drying.

3. The method for producing a surface-treated glass fiber film according to claim 1, wherein the surface-treated glass fiber film has a value of a conventional flexural rigidity of the surface-treated glass fiber film measured by a method disclosed in JIS R 3420 that is 3 to 100 times, relative to a value of a conventional flexural rigidity of an untreated glass fiber film.

4. The method for producing a surface-treated glass fiber film according to claim 2, wherein the surface-treated glass fiber film has a value of a conventional flexural rigidity of the surface-treated glass fiber film measured by a method disclosed in JIS R 3420 that is 3 to 100 times, relative to a value of a conventional flexural rigidity of an untreated glass fiber film.

5. The method for producing a surface-treated glass fiber film according to claim 1, wherein the surface-treated glass fiber film has a coefficient of linear expansion in an X-Y direction of 20 ppm/° C. or less.

6. The method for producing a surface-treated glass fiber film according to claim 2, wherein the surface-treated glass fiber film has a coefficient of linear expansion in an X-Y direction of 20 ppm/° C. or less.

7. The method for producing a surface-treated glass fiber film according to claim 3, wherein the surface-treated glass fiber film has a coefficient of linear expansion in an X-Y direction of 20 ppm/° C. or less.

8. The method for producing a surface-treated glass fiber film according to claim 4, wherein the surface-treated glass fiber film has a coefficient of linear expansion in an X-Y direction of 20 ppm/° C. or less.

9. The method for producing a surface-treated glass fiber film according to claim 1, wherein the surface-treated glass fiber film has a glass transition temperature measured by a method disclosed in JIS C 6481 of not in the range of 250° C. or less.

10. The method for producing a surface-treated glass fiber film according to claim 2, wherein the surface-treated glass fiber film has a glass transition temperature measured by a method disclosed in JIS C 6481 of not in the range of 250° C. or less.

11. The method for producing a surface-treated glass fiber film according to claim 3, wherein the surface-treated glass fiber film has a glass transition temperature measured by a method disclosed in JIS C 6481 of not in the range of 250° C. or less.

12. The method for producing a surface-treated glass fiber film according to claim 4, wherein the surface-treated glass fiber film has a glass transition temperature measured by a method disclosed in JIS C 6481 of not in the range of 250° C. or less.

13. The method for producing a surface-treated glass fiber film according to claim 1, wherein the hydrolysable silane compound is one or more types of compounds selected from a halogenated silane compound, an alkoxy silane compound, a hydroxyl silane compound, and a silazane compound.

14. The method for producing a surface-treated glass fiber film according to claim 2, wherein the hydrolysable silane compound is one or more types of compounds selected from a halogenated silane compound, an alkoxy silane compound, a hydroxyl silane compound, and a silazane compound.

15. The method for producing a surface-treated glass fiber film according to claim 3, wherein the hydrolysable silane compound is one or more types of compounds selected from a halogenated silane compound, an alkoxy silane compound, a hydroxyl silane compound, and a silazane compound.

16. The method for producing a surface-treated glass fiber film according to claim 4, wherein the hydrolysable silane compound is one or more types of compounds selected from a halogenated silane compound, an alkoxy silane compound, a hydroxyl silane compound, and a silazane compound.

17. A flexible fiber substrate comprising a surface-treated glass fiber film produced by the method for producing a surface-treated glass fiber film according to claim 1.

18. A flexible fiber substrate comprising a surface-treated glass fiber film produced by the method for producing a surface-treated glass fiber film according to claim 2.

19. A flexible fiber substrate comprising a surface-treated glass fiber film produced by the method for producing a surface-treated glass fiber film according to claim 3.

20. A flexible fiber substrate comprising a surface-treated glass fiber film produced by the method for producing a surface-treated glass fiber film according to claim 4.

* * * * *